July 7, 1970  J. Z. KREZANOSKI ET AL  3,519,005

CONTACT LENS CLEANING AND STORAGE DEVICE

Filed July 29, 1968  4 Sheets-Sheet 1

INVENTORS
JOSEPH Z. KREZANOSKI
JOHN C. PETRICCIANI

*Finnegan, Henderson & Farabow*

ATTORNEYS

INVENTORS
JOSEPH Z. KREZANOSKI
JOHN C. PETRICCIANI

Finnegan, Henderson & Farabow
ATTORNEYS

July 7, 1970  J. Z. KREZANOSKI ET AL  3,519,005
CONTACT LENS CLEANING AND STORAGE DEVICE Filed July 29, 1968  4 Sheets-Sheet 3

INVENTORS
JOSEPH Z. KREZANOSKI
JOHN C. PETRICCIANI

*Finnegan, Henderson & Farabow*
ATTORNEYS

July 7, 1970  J. Z. KREZANOSKI ET AL  3,519,005
CONTACT LENS CLEANING AND STORAGE DEVICE
Filed July 29, 1968  4 Sheets-Sheet 4

INVENTORS
JOSEPH Z. KREZANOSKI
JOHN C. PETRICCIANI

Finnegan, Henderson & Farabow
ATTORNEYS

United States Patent Office 3,519,005
Patented July 7, 1970

3,519,005
CONTACT LENS CLEANING AND STORAGE DEVICE
Joseph Z. Krezanoski and John C. Petricciani, Los Altos, Calif., assignors to Flow Pharmaceuticals, Inc., Mountain View, Calif., a corporation of Nevada
Filed July 29, 1968, Ser. No. 748,277
Int. Cl. B08b 3/06
U.S. Cl. 134—143
13 Claims

ABSTRACT OF THE DISCLOSURE

A device for cleaning and storing contact lenses comprising a transfer case for releasably confining a pair of contact lens in axial alignment and a fluid-tight container for holding the case and immersing it within a lens treating solution. Conduit means are provided in the case to permit the treating solution to bathe the lenses when the case is inserted into the container and to permit fluid to be forced through the case to clean the lenses when the case is removed from the container. Preferably, means are also provided for removably securing the transfer case to the container cap to facilitate insertion and removal of the case.

---

This invention relates to equipment for contact lenses, and more particularly to a cleaning and storing device for contact lenses.

A variety of contact lens cleaning and storing devices have been provided in the past for the maintenance and proper care of contact lenses. While these devices, including both separate and combination devices, have solved some of the problems involved in the storing and cleaning of contact lenses, the devices are often too bulky to conveniently carry on the person and their use frequently involves a rather complicated procedure.

Separate cleaning and storage devices, for example, require the wearer to manually grasp the lenses to transfer the lenses from the cleaning device to the storage device and vice versa. For contact lens wearers, however, such a procedure is inconvenient, because the small size of the lenses and their wetted condition makes them difficult to grasp securely and exposes the lenses to frequent opportunities for damage or loss due to scratching, dropping, or misplacing the lenses. While combined cleaning and storage devices eliminate the problems of manual transfer, the devices that have heretofore been provided are too bulky to permit the device to be conveniently carried in the wearer's pocket or purse. Further, such large, bulky devices require the use of large volumes of lens treating solution, and because recommended use requires frequent change of the solution, such devices are not economical.

Manual handling problems also occur in contact lens care when the lenses are rinsed in running tap water, usually while holding the lens between the fingers. Often the rinsing is inadequate because of the patient's fear of dropping or losing the lens.

Because of the complicated and inconvenient cleaning, transfer, and storage procedures required when using presently available contact lens storage and cleaning units, many patients occasionally or systematically disregard the contact lens fitter's instructions on the use of these devices and expose their lenses to improper care and potential damage. Of even more consequence than possible damage to the lenses, is the potential discomfort, irritation, and even infection of the eye that can be directly caused by a patient's attempts to simplify the procedure for cleaning and storing the lenses.

In addition, most contact lens storage cases that have been provided do not always provide for complete immersion of the lenses in a lens treating solution which is necessary to keep the lenses in a hydrated condition and to cleanse the lenses of undesirable organic, inorganic, and proteinaceous material that have been adsorbed on the lens surfaces from the eye.

Accordingly, the present invention provides a compact and portable device for the cleaning and storing of contact lenses that permits the wearer to adequately clean and store his lenses in a simple, convenient, and troublefree manner and thereby minimize damage to the lenses and discomfort or irritation to the eye.

As embodied and broadly described, the invention provides a contact lens cleaning and storing device comprising a cup-shaped base having side walls for holding a quantity of lens treating solution, a cap for the base, connecting means for removably interconnecting the cap to the base to form a fluid-tight container, a transfer case insertable within the container and removable therefrom for holding a pair of contact lenses, the transfer case including means for forming a pair of axially aligned lens holding compartments, a displaceable cover for each compartment to releasably confine the lenses in the compartments, and conduit means serially connecting the outer surface of both of said covers with both of said lens compartments to permit fluid to flow into and through both of the lens holding compartments.

It is to be understood that both the foregoing general description and the following detailed description are exemplary and explanatory but are not restrictive of the invention.

The accompanying drawings, which are incorporated in and constitute a part of this invention, illustrate a preferred embodiment of the invention, and together with the description serve to explain the principles of the invention.

Figure 1:
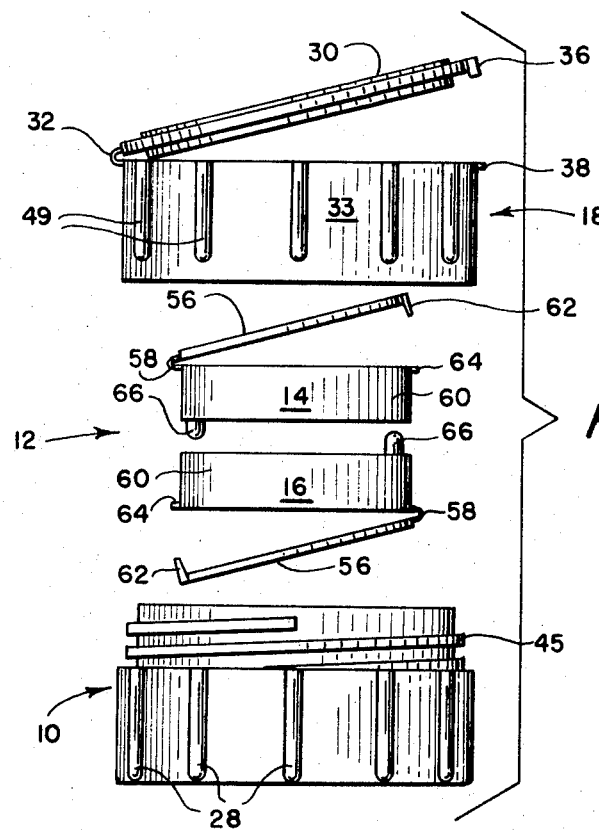
FIG. 1 is an exploded side elevation view of the elements of the cleaning and storage device of this invention.
Figure 2:
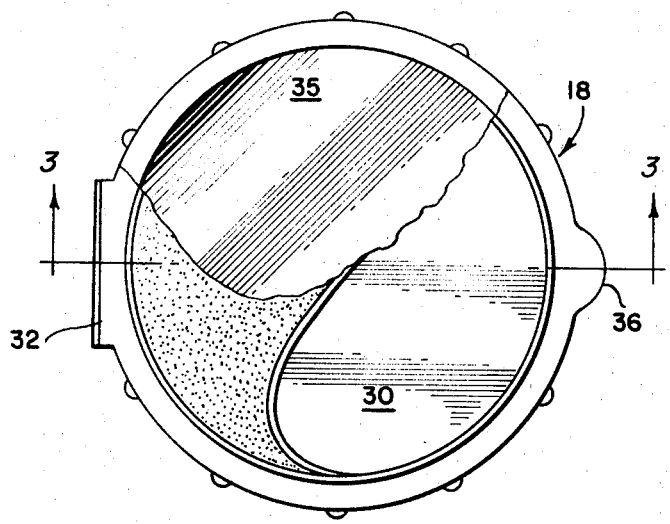
FIG. 2 is a top plan view of the assembled device with a portion of its cap cut away.
Figure 3:
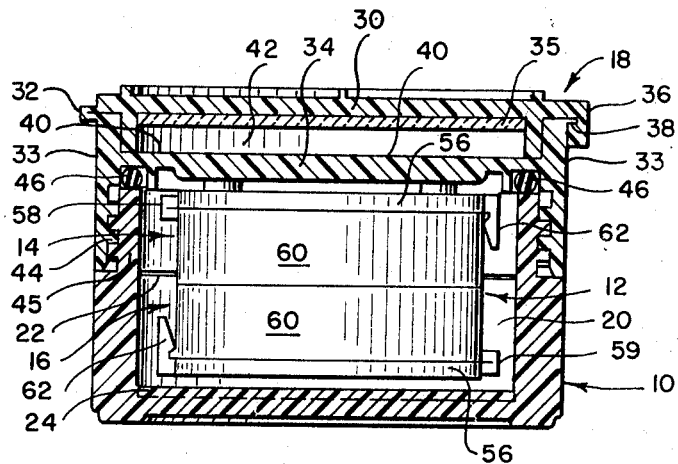
FIG. 3 is a sectional view taken along line 3—3 of FIG. 2.

The major elements of the preferred embodiment of the invention are illustrated in FIG. 1 and include a cup-shaped base, generally 10; a transfer case, generally 12; and a cap, generally 18. As best seen in FIG. 3, and when the device is assembled, base 10 and cap 18 form a liquid-tight container that encloses transfer case 12.

The storage and cleaning device of this invention can be made from a variety of metal or plastic materials that have sufficient rigidity and resistance to abrasion to enable the device to be carried in a pocket or purse, and resistance to corrosive action by the usual water-based lens cleaning and storage solutions. Polypropylene, polyethylene, and other synthetic organic polymeric materials that can be easily molded, are preferred materials of construction. It is desirable that the transfer case be of a material that is softer than the contact lenses to avoid abrasion of the lenses.

Figure 6:
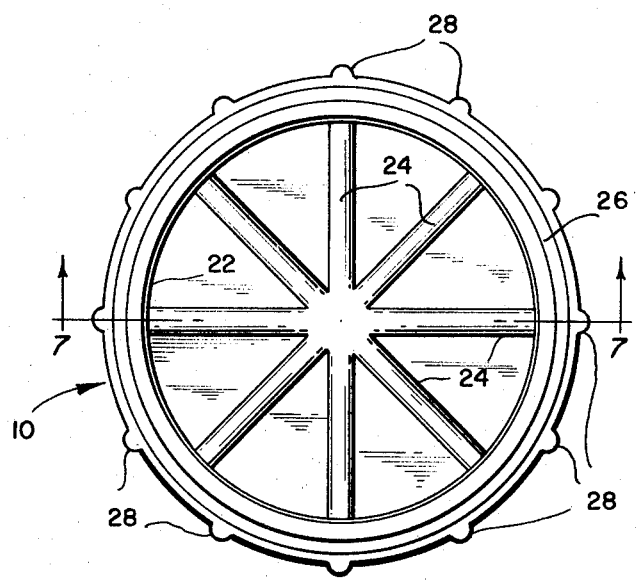
FIG. 6 is a plan view of the inside of the base.
Figure 7:
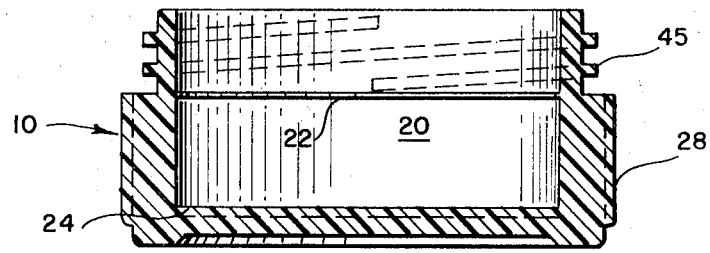
FIG. 7 is a sectional view of the base taken along line 7—7 of FIG. 6.

In accordance with the invention, the base 10 serves as a receptacle for liquids and particularly lens treating solutions, and cooperates with cap 18 to provide a fluid-tight container. As embodied, and as best shown in FIGS. 6 and 7, base 10 is cylindrical and forms an open-topped receptacle 20 for the solution. As shown in FIG. 3, the height and inside diameter of receptacle 20 slightly exceeds the height and largest transverse dimension of transfer case 12 to permit the transfer case to be inserted into the receptacle.

A fill line 22 is provided on the interior side wall of base 10 to mark the desired level for filling receptacle 20 with the lens treating, cleaning or storage solution.

A plurality of elevated spokes 24, as shown in FIG. 6, is provided on the upper surface of the bottom of base 10 to elevate transfer case 12 and to permit fluid to pass through and underneath the transfer case when the case is inserted into the receptacle. Spokes 24 also prevent the transfer case from seating itself on the flat surface of the base and being held thereby by surface tension.

As best seen in FIG. 1, the lower portion of the outer side walls of base 10 has a plurality of circumferential ridges 28 that permit the user to firmly grasp base 10 while disengaging cap 18.

Figure 4:
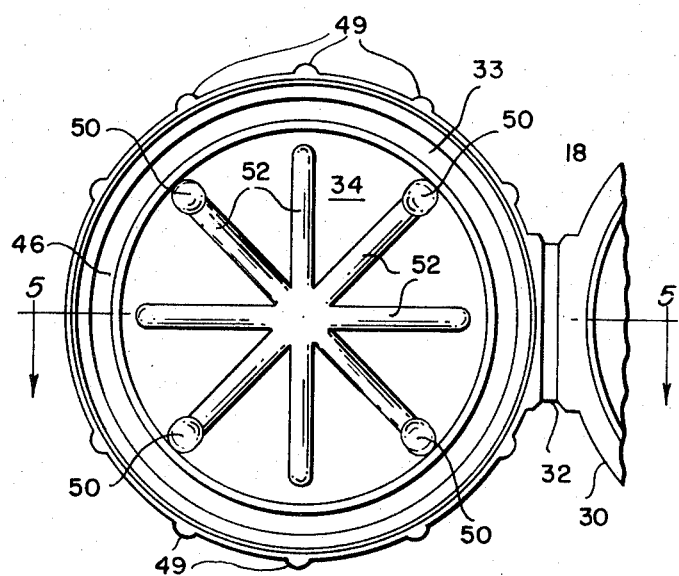
FIG. 4 is a plan view of the inside of the cap.
Figure 5:
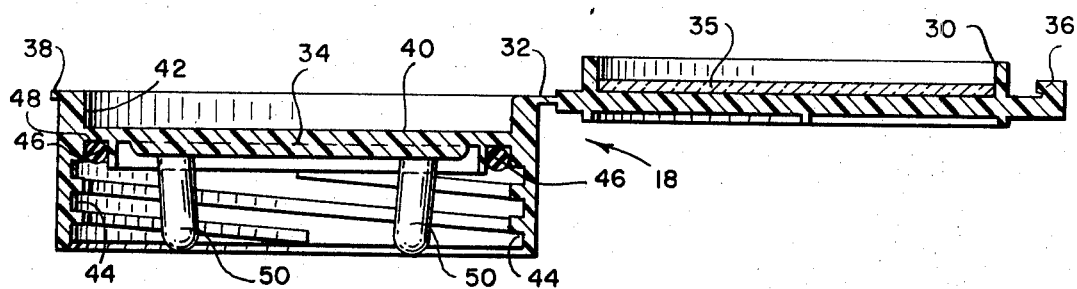
FIG. 5 is a sectional view of the cap taken along line 5—5 of FIG. 4.

As shown in FIGS. 1–4, cap 18 is cylindrical and includes side walls 33 and a top 34. The outer side walls 33 of cap 18 extend beyond cap top 34 to form a housing 42. A lid 30 is hinged at 32 to the outer side of cap 18 and includes a snap 36 that engages a ridge 38 on the cap 18 to lock the lid in a closed position. As shown in FIGS. 3 and 5, a mirror 35 is either frictionally fitted or adhesively secured to the inside surface of lid 30 and the bottom 40 of housing 42 provides a convenient location for mounting suitable identifying information.

In accordance with the invention means are provided for removably interconnecting the cap to the base to form a liquid-tight container. As embodied and as illustrated in FIGS. 3 and 5, this means includes interior screw threads 44 on the lower portion of the side walls 33 of cap 18 and mating exterior screw threads 45 on the upper portion of the side walls of base 10.

An O-ring seal 46 is seated in an annular slot 48 on the interior surface of cap 18 to provide a liquid-tight seal with the top surface of the threaded portion of base 10. When cap 18 is tightly twisted onto base 10, the O-ring seal is compressed and effectively seals the liquid in the interior of the container.

The outer surface of side walls 33 of cap 18 also has a plurality of circumferential ridges 49 that permit the user to firmly grasp the cap and twist it with respect to base 10.

In accordance with the invention transfer case 12 for holding a pair of contact lenses includes means forming a pair of axially aligned lens holding compartments.

Figure 8:
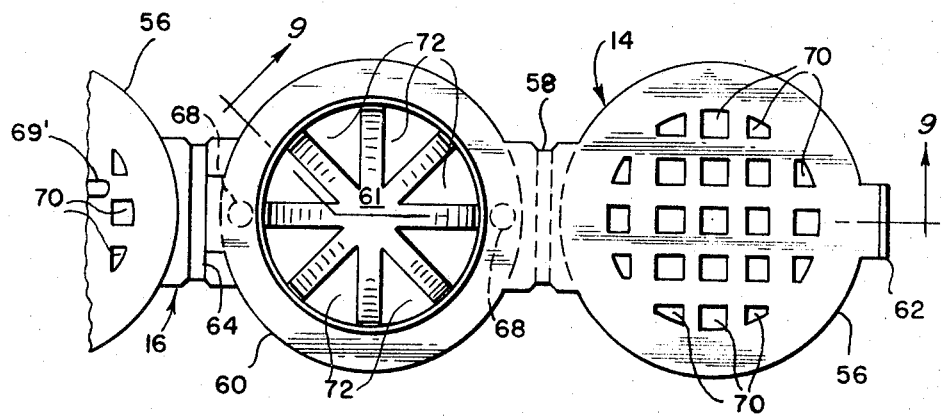
FIG. 8 is a top plan view of one end of the transfer case showing the lids in an open position.
Figure 9:
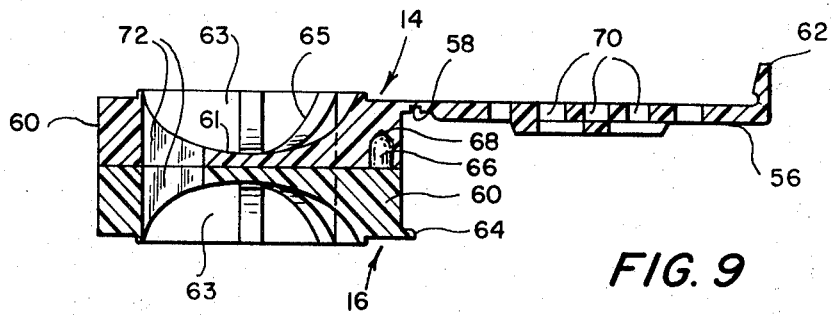
FIG. 9 is sectional view taken along line 9—9 of FIG. 8.

As embodied, and as best shown in FIGS. 8 and 9, the means comprises an outer cylindrical wall 60 forming a hollow chamber and a platform 61 located across the chamber perpendicular to its axis and midway of its length. Platform 61 and cylindrical wall 60 form a pair of separate and axially aligned lens holding compartments 63. Preferably, the upper and lower surfaces of platform 61 are dish-shaped to form a cradle for receiving the convex surfaces of the lenses.

A displaceable cover or lid 56 is provided for each compartment that is hinged at 58 to wall 60 to releasably confine the lenses in the compartments. Each lid 56 has a snap 62 positioned opposite the hinge to engage a ridge 64 on the transfer case to secure the lids in locked position.

Preferably, and as best shown in FIGS. 1 and 9, transfer case 12 is constructed of two similar elements, generally 14 and 16, each of which is capable of holding one contact lens. As clearly shown in the drawings, the bases of each element comprise one-half of platform 61 and the side walls of each element, one-half of wall 60 so that when the bases of the elements are placed in abutting relationship, a two-compartment lens case 12 is provided. Securing means, such as prongs 66 and detents 68, are provided on the adjoining surfaces of the bases of each element 14 and 16 to frictionally hold the elements together.

Figure 10:
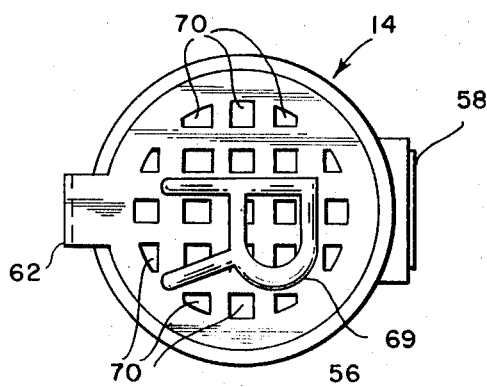
FIGS. 10 and 11 are plan views of opposite ends of the transfer case showing the lids in a closed position.
Figure 11:
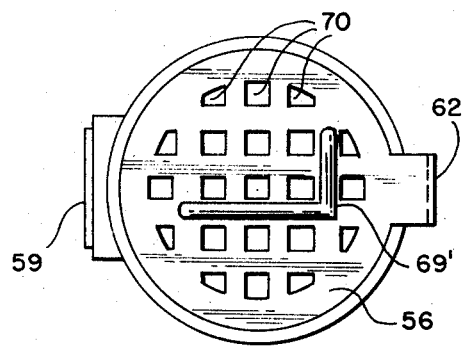

As seen in FIGS. 10 and 11, a raised letter R 69, or L 69', is provided on the outer surface of each of lid 56 to provide for tactile identification of the lens compartments. The left and right lens compartments can also be differentiated by color. The two-part construction of the transfer case permits molding elements 14 and 16 of different colors and this two-color construction provides a positive visual means of identification that permits contact lens wearers to readily distinguish one lens compartment from the other. Two-part construction of the case thus represents a preferred embodiment of this invention. It will readily be apparent to those skilled in the art, however, that transfer case 12 can be of one-piece construction instead of the two-part construction shown in the drawings without departing from the scope of this invention.

In accordance with the invention, conduit means are provided in the transfer case to serially interconnect the outer surfaces of both lids 56 with both lens compartments to permit fluid to flow into and through both of the lens holding compartments. Thus when case 12 is inserted into the container, as shown in FIG. 3, the lens treating solution floods the lenses retained in the lens compartments and when the case is removed from the container, a fluid can be forced through the case to clean or rinse the lenses. Preferably, the conduit means extend in the axial direction of the case so that large volumes of water can be flushed through the transfer case by placing the outer surface of either lid 56 tightly against a tap water orifice.

As best shown in FIGS. 8–11, the conduit means comprises a plurality of perforations 70 in each lid 56 and a plurality of arcuate openings 72 in platform 61. Preferably, openings 72 extend, in radially spaced relationship, out from the axis of the transfer case a distance that exceeds the radius of a lens placed in the transfer case to permit unobstructed flow of fluid through at least a portion of the cross-section of each lens compartment.

In accordance with the invention, holding means can be provided on the interior surface of cap 18 for releasably holding the transfer case. The holding means permit precise positioning of the transfer case in the interior of the container to insure that the lenses, held by the transfer case, are submerged in the solution, regardless of the position of the device in a pocket or a purse. Because the holding means are releasable, the transfer case can readily be removed from the cap to permit flushing large volumes of tap water through it.

Mounting the holding means on cap 18 also conveniently allows the wearer to insert the transfer case (and the lenses) into the container and to remove it therefrom simultaneously with application and removal of cap 18, thus preventing contact with or spilling of the lens treating solution in the container.

Further, the threaded side portion 44 of cap 18 forms a basin for collecting fluid draining from the transfer case after the cap is removed from the base and inverted, to further prevent spilling of the lens treating solution.

The ease and convenience of removal of the lenses from the device coupled with the provision for complete submergence of the lenses regardless of the attitude of the device is a unique functional aspect of the present invention that results from the novel structure of the device.

As embodied, and as best shown in FIG. 5, the holding means comprise a plurality of radially spaced fingers 50 that protrude downwardly and inwardly towards the axis of the container from the lower interior surface of cap top 34. The tips of fingers 50 are sufficiently flexible to permit their outward deformation when transfer case 12 is inserted between the fingers.

When flexible fingers are used as the holding means, at least three (3) grasping fingers are desirable. In the preferred embodiment, and as illustrated in FIG. 4, four (4) fingers 50 are provided with pairs of fingers positioned diametrically apart relative to the axis of the container. The base portions of each pair of opposed fingers 50 are spaced apart a distance that exceeds the diameter of the transfer case 12 and the tip portions are spaced apart a distance slightly smaller than the diameter of the transfer case. This configuration of fingers 50 permits transfer case 12 to be easily inserted and removed from between fingers 50, and permits the holding means to firmly suspend the transfer case.

A plurality of elevated spokes 52 are provided on the inner surface of cap top 34 to permit flow of the lens-treating solution around and through the adjacent surface of transfer case 12 when it is inserted into the container. Spokes 52 on cap 18 thus perform a function similar to the function of spokes 24 on base 10.

The contact lens cleaning and storage device of this invention enables a patient to follow convenient contact lens care and handling regimens. For example, in preparing the lenses for storage after removal from the eye, the following procedure can be followed. A few drops of good cleaning solution are applied over all the lens surfaces. One lens is first inserted into its proper compartment in transfer case 12, the lid closed, and the case is then inverted for receipt of the other lens. Lids 56 are locked in place by engaging snaps 62 on corresponding ridges 64 on the wall 60 of the case.

A forced spray of cool tap water is then passed through the transfer case by holding either lid 56 tightly against the nozzle of the running cool tap water faucet. The rapid flow of large volumes of water through the transfer case, which is possible due to the axially aligned perforations in the transfer case, permits efficient cleaning and rinsing of the lenses. After the rinsing operation has been completed, excess water is blotted from the transfer case, and the transfer case is inserted between fingers 50 on cap 18.

Base 10 is then filled with cleaning and storage solution up to fill line 22. Cap 18 with transfer case 12 suspended therefrom is screwed down tightly against base 10 to form a fluid-tight container and submerge transfer case 12 and the lenses in the solution.

The contact lens cleaning and storage device of this invention can also be used with the soft gel contact lenses or so-called soflens. These soft gel lenses should be cleaned and stored in a normal saline solution, or less preferably, in water. The preent invention provides an excellent device for carrying out prescribed care and handling regimens for these lenses.

After removal from the eyes, the soft gel lenses are inserted into transfer case 12 and base 10 is filled with a normal saline solution. Cap 18, having transfer case 12 suspended from it, is then screwed down tightly against base 10 to submerge the lenses in the solution and to form a fluid-tight container. The entire device is then placed in a bath of boiling water and boiled for about 15 minutes to sterilize the lenses.

Following cleaning, the lenses can be stored in the same saline solution.

Removal of the lenses from the storage case and preparation of the lenses for wearing is also a simple and convenient procedure using the cleaning and storage device of this invention. The lenses are removed by unscrewing cap 18 from base 10, inverting cap 18, and subsequently removing transfer case 12 from the grasp of flexible fingers 50. The lenses in the transfer case are then rinsed with cool tap water by again holding the transfer case tight up against a water nozzle to create a forced spray through the transfer case. This operation insures removal of all cleaning and storage solution from the lenses. The individual lens can easily be removed from the transfer case by first unsnapping one lid 56 and by placing a drop of wetting solution on the fingertip to facilitate removal of the lens from its compartment. The case is then inverted and the other lens removed in the same manner. For convenience in inserting the lenses in the eyes, the mirror 35 in lid 30 may be used.

From the foregoing description, it is apparent that this invention provides a new and improved contact lens cleaning and storage device. The device is simple to use and is inexpensive to manufacture. It eliminates or remedies the common faults of existing contact lens cleaning and storage devices including bulkiness, incomplete submersion of the lenses in some attitudes of the device, leaking and spilling of liquid from the devices, and security of handling the lenses during a tap water rinsing operation.

The invention in its broader aspects is not limited to the specific structure shown and described and departures may be made from such details without departing from the principles of the invention and without sacrificing its chief advantages.

What is claimed is:

1. A contact lens cleaning and storing device comprising:
    (a) a cup-shaped base having side walls for holding a quantity of lens treating solution;
    (b) a cap for said base;
    (c) connecting means for removably interconnecting the cap to the base to form a fluid-tight container;
    (d) a transfer case insertable within the container and removable therefrom for holding a pair of contact lenses, said transfer case including:
        (i) means for forming a pair of axially aligned lens holding compartments,
        (ii) a displaceable cover for each compartment to releasably confine the lenses in the compartments, and
        (iii) conduit means serially connecting the outer surface of both of said covers with both of said lens compartments to permit fluid to flow into and through both of the lens holding compartments.

2. The device of claim 1, including holding means for releasably holding the transfer case to the inside of the container cap to permit the simultaneous insertion of said transfer case into the base when the cap is connected to the base and to permit the simultaneous removal of said transfer case when the cap is disconnected from the base.

3. A contact lens cleaning and storage device comprising:
    (a) a cup-shaped base having side walls for holding a quantity of lens treating solution;
    (b) a cap for said base;
    (c) connecting means for removably interconnecting the cap to the base to form a fluid-tight container;
    (d) a transfer case insertable within the container and removable therefrom for holding a pair of contact lenses, said transfer case including:
        (i) an outer wall forming a hollow chamber,
        (ii) a platform mounted across the chamber midway of its length to form a pair of axially aligned lens holding compartments within the chamber,
        (iii) said platform having openings interconnecting the pair of lens compartments,
        (iv) a lid for each compartment to releasably confine a lens in each compartment, and
        (v) said lid having perforations to permit fluid to flow into and through each of the lens holding compartments.

4. The device of claim 3, including holding means for releasably holding the transfer case to the inside of the container cap to permit the simultaneous insertion of said transfer case into the base when the cap is connected to the base and to permit the simultaneous removal of said transfer case when the cap is disconnected from the base.

5. The device of claim 4, wherein said holding means includes a plurality of fingers that extend downwardly and inwardly from the inside surface of the cap to frictionally engage the transfer case.

6. The device of claim 3, wherein the platform of the transfer case is shaped on opposite surfaces to conform to the contour of one surface of the lenses.

7. The device of claim 3, wherein the base is capable of holding a given quantity of lens treating solution and the transfer case is of a sufficient size, relative to the interior volume of the container, to displace this solution and substantially flood the confined lenses with solution when said cap is tightly fitted to the base regardless of the attitude of the container.

8. The device of claim 3, wherein the transfer case comprises two substantially identically-shaped elements, each of said elements including a base having openings therein, a side wall forming a single lens holding compartment with said base, and a perforated lid to releasably confine a lens in each compartment, and means for securing the elements together so that the bases of each element abut with their openings aligned and form the platform.

9. The device of claim 3, wherein the connecting means comprises mating screw threads on the base and the cap.

10. The device of claim 9, wherein the base and cap are cylindrical and including a compressible O-ring to form a fluid-tight connection between the base and cap.

11. The device of claim 3, wherein the outer wall of the transfer case is cylindrical forming a cylindrical hollow chamber, the platform has concave upper and lower surfaces and is mounted across the chamber, perpendicular to its axis and midway of its length, to form a pair of dish-shaped lens compartments within the chamber, said platform having a plurality of arcuate shaped openings extending radially outward from the axis of the chamber and interconnecting the pair of lens compartments, and the lids have indicia on the outer surfaces for identifying a lens in the respective compartment.

12. A contact lens cleaning and storage device comprising:
(a) a cup-shaped base having side walls for holding a quantity of lens treating solution;
(b) a cap for said base;
(c) connecting means for removably interconnecting the cap to the base to form a fluid-tight container;
(d) transfer means insertable within the container and removable therefrom for holding a pair of contact lenses, said transfer means including:
(i) means for forming a pair of axially aligned lens holding compartments,
(ii) a displaceable cover for each compartment to releasably confine the lenses in the compartments, and
(iii) conduit means serially connecting the outer surface of both of said covers with both of said lens compartments to permit fluid to flow into and through both of the lens holding compartments.

13. The device of claim 12, wherein the transfer means comprises a pair of substantially identically shaped elements, each of said elements including a base having openings therein, a side wall forming a single lens holding compartment with said base, and a perforated lid for releasably confining a lens in the compartment.

References Cited
UNITED STATES PATENTS

| | | | |
|---|---|---|---|
| 3,035,589 | 5/1962 | King | 134—37 |
| 3,070,105 | 12/1962 | Brown. | |
| 3,101,087 | 8/1963 | Watson | 134—143 |
| 3,124,240 | 3/1964 | Croan. | |
| 3,250,283 | 5/1966 | Reinfeld | 21—87 XR |

DANIEL BLUM, Primary Examiner

U.S. Cl. X.R.

206—5; 220—20.5